United States Patent [19]

Osanai

[11] 4,180,834
[45] Dec. 25, 1979

[54] HEAD MOUNTING DEVICE FOR TAPE RECORDER

[75] Inventor: Akira Osanai, Hachioji, Japan

[73] Assignee: Olympus Optical Company Ltd., Tokyo, Japan

[21] Appl. No.: 829,594

[22] Filed: Sep. 1, 1977

Related U.S. Application Data

[62] Division of Ser. No. 794,065, May 5, 1977.

[30] Foreign Application Priority Data

May 11, 1976 [JP] Japan .............................. 51/59249

[51] Int. Cl.² ............................................. G11B 5/56
[52] U.S. Cl. ............................................. 360/109
[58] Field of Search .................. 360/109, 105, 104, 96

[56] References Cited

U.S. PATENT DOCUMENTS

| 3,373,248 | 3/1968 | Baybick et al. | 360/109 |
| 3,440,359 | 4/1969 | Page et al. | 360/109 X |
| 3,539,191 | 11/1970 | Yamamoto | 360/109 X |
| 3,794,769 | 2/1974 | Neff | 360/109 |
| 3,882,543 | 5/1975 | Richards | 360/109 |
| 3,943,569 | 3/1976 | Bettini et al. | 360/109 |
| 4,052,745 | 10/1977 | Nakamichi | 360/109 |

FOREIGN PATENT DOCUMENTS

2527139 12/1976 Fed. Rep. of Germany .......... 360/109

Primary Examiner—John H. Wolff
Attorney, Agent, or Firm—Lerner, David, Littenberg & Samuel

[57] ABSTRACT

A device for tape recorder comprises a head mounting plate to which a magnetic head is secured, and a head support plate formed with a notch which is adapted to receive the mounting plate therein for permitting an adjustment of the elevation of the mounting plate relative to the support plate, and for minimizing the space occupied by the head and its mounting assembly.

3 Claims, 7 Drawing Figures

HEAD MOUNTING DEVICE FOR TAPE RECORDER

This application is a division of application Ser. No. 794,065, filed May 5, 1977.

BACKGROUND OF THE INVENTION

The invention relates to a head mounting device for tape recorders, and more particularly, to such devices used in a small size tape recorder.

A magnetic head represents one of the most critical parts of a tape recorder, and its location is adjusted so that the head surface may be brought to a proper close engagement with a tape. The adjustment includes that of the elevation, azimuth, angular position, pressure of contact etc. of the head relative to the tape. The adjustment of the elevation usually takes place by the use of a distance or spacer piece or an adjustable screw. However, these elements are mounted on a head mounting plate or a support plate therefor, and hence there must be some free space left above them for such adjustment. This stands in the way to reducing the thickness of a small size tape recorder.

SUMMARY OF THE INVENTION

It is an object of the invention to overcome the above difficulty by providing a head mounting device for a tape recorder in which a magnetic head is mounted on a head mounting plate that is adapted to be placed on a head support plate which has a notch for receiving the head mounting plate.

The provision of a notch for receiving the head mounting plate reduces the required space for vertically adjusting it in elevation and azimuth, thus allowing the thickness of the recorder to be reduced.

DETAILED DESCRIPTION OF PREFERRED EMBODIMENT

Parent application Ser. No. 794,065 describes the tape recorder mechanism in great detail. As a result the description set forth herein will be limited to the portions of the recorder related to the invention claimed herein.

Figure 1:
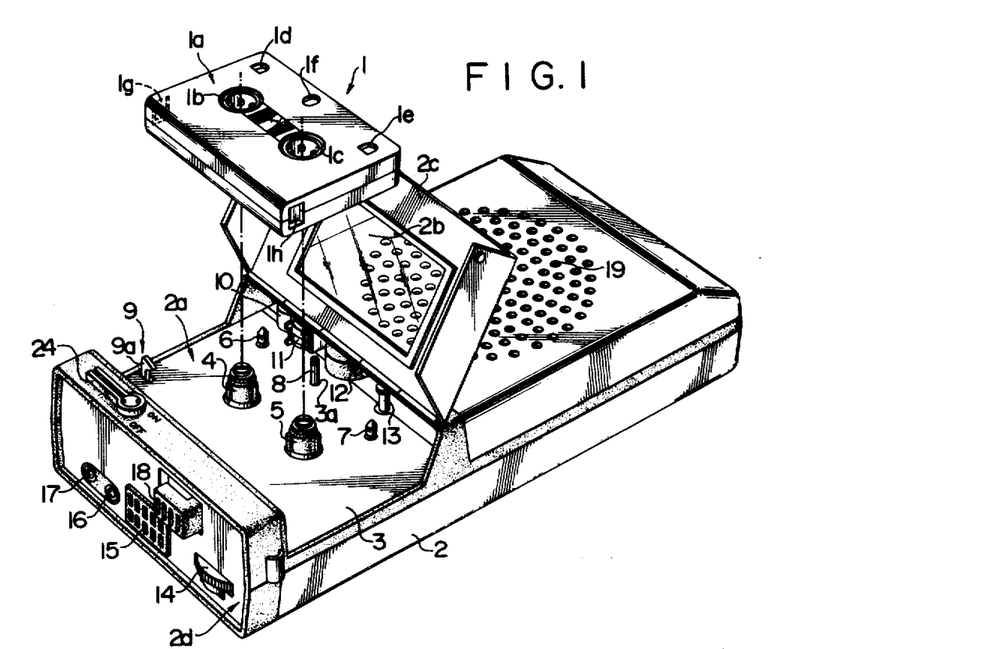
FIG. 1 is a perspective view of a cassette tape recorder according to the invention, also illustrating a tape cassette and a cassette receiving region of the recorder.
Figure 2:
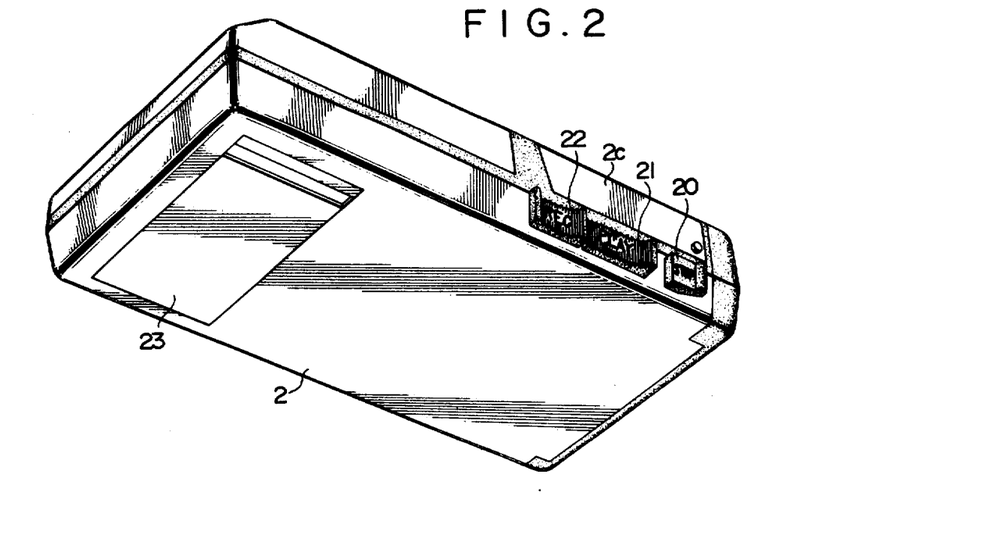
FIG. 2 is a perspective view of the recorder shown in FIG. 1 as viewed from the rear side thereof, particularly illustrating the backside and underside thereof.

Referring to FIGS. 1 and 2, there is shown a perspective view of a miniature tape recorder to which the invention is applied. It is to be understood that a micro-cassette 1 and a miniature tape recorder 2 in which the cassette is detachably loaded are both well known. It is to be understood initially that while the invention will be described below with reference to a miniature tape recorder utilizing a micro-cassette, the features of the invention including the auto shut-off apparatus and the rotary drive mechanism are equally applicable to a tape recorder which utilizes a compact tape cassette.

In FIG. 1, the front of the tape recorder 2 is located at the left-hand end while the right-hand end represents the rear part. A cassette receiving region 2a is formed in the upper half of the recorder toward the front end. The region 2a includes a panel 3 through which a tape supply shaft 4 (which will be a tape rewind shaft during a tape rewind mode) and a tape take-up shaft 5 (which will be a tape supply shaft during a tape rewind mode) extend at preselected locations. In addition, positioning pins 6,7 for properly locating the loaded position of the tape cassette 1 as well as a capstan 8 for transporting the tape at a uniform rate, extend through the panel 3. Along one side of the cassette receiving region 2a and toward the front end, there is exposed a detecting member 9 extending through the panel 3, which member is adapted to detect a lug provided on the portion of a cassette loaded into the recorder for preventing an inadvertent erasure. As will be described later, the detecting member 9 operates to detect the presence or absence of the lug on the loaded cassette as a record button is operated.

An erase head 10, a record/playback head 11, a pinch roller 12, and a locking member 13 which prevents an inadvertent withdrawal of a cassette loaded into the recorder are located on a stationary baseplate to be described later, toward the inner end of the region 2a. The erase head 10 comprises a permanent magnet and is moved into contact with the magnetic surface of the tape contained within the loaded cassette for erasing an unnecessary recorded signal on its record track as a record button, to be described later, is moved to a given position. The head 11 is moved into contact with the magnetic surface of the cassette tape as a playback button is operated, for performing a recording or playback operation. The pinch roller 12 is moved into abutment against the capstan 8 with a tape portion held therebetween, as the playback button is operated. The cooperation between the pinch roller and the capstan serves to feed the tape.

As is well known, the micro-cassette 1 which is adapted to be loaded into the region 2a includes a cassette body 1a, and a pair of rotatable tape hubs 1b, 1c for receiving a tape wound thereon. The hubs 1b, 1c are adapted to "rattle" slightly with respect to the body 1a, and one tape hub 1b is adapted to fit over the tape supply shaft 4 while the other tape hub 1c is adapted to fit over the tape take-up shaft 5. Each of the hubs 1b, 1c includes inwardly extending projections which engage between outwardly extending projections of the respective shafts 4, 5. When one of the shafts 4, 5 is positively driven, both hubs rotate in the same direction, the tape disposed on one hub being unwound and then taken up on the other hub.

The micro-cassette 1 is also formed with positioning openings 1d, 1e, which respectively receive the positioning pins 6, 7, as well as a capstan aperture 11. A pair of lugs 1g, 1h for preventing an inadvertent erasure are formed in each of the opposite sidewalls of the cassette. When the cassette 1 is loaded into the region 2a, the latter is closed by a movable cover 2c having a window 2b formed therein.

On its front end face, the recorder 2 is provided with an operation panel 2d in which are disposed a volume control 14, a grille 15 for an internally housed microphone, a jack 16 for connection with an external microphone and an earphone jack 17. In addition, an operating button 18 is disposed in the operation panel 2d for establishing a rapid tape advance, cue, tape rewind and review mode. A pause knob 24 is disposed on top of the recorder surface adjacent to the front end. A plurality of small air passage perforations 19 are formed in the upper surface of the recorder 2 toward its rear end, and a loudspeaker (not shown) is internally housed within the recorder at a position below the perforations.

As will be noted from FIG. 2, which is a bottom and rear view of the tape recorder 2 shown in FIG. 1 as viewed from the front and left-hand side, a record button 20, a playback button 21 and a stop button 22 are disposed in sequence on one sidewall of the recorder 2. When a playback mode of the recorder 2 is to be established, the playback button 21 is moved, by a sliding motion, to a given position toward the stop button 22. A record mode can be established by moving both the record and playback buttons 20 and 21 toward the stop button 22, by a sliding motion. When either the playback or record mode is to be released, the stop button 22 may be moved toward the front end of the recorder. In FIG. 2, numeral 23 represents a lid over a battery containing chamber.

The arrangement and operation of the internal mechanism will now be described. However, the electrical circuit of the tape recorder will not be described since it has no direct bearing with the present invention.

(1) Tape drive mechanism

A tape drive mechanism comprises the capstan mentioned above which transports a tape at a uniform rate, a flywheel for rotating the capstan at a uniform rate, a drive motor, and a drive transmission member which transmits the rotating power from the motor to the flywheel.

Figure 3A:
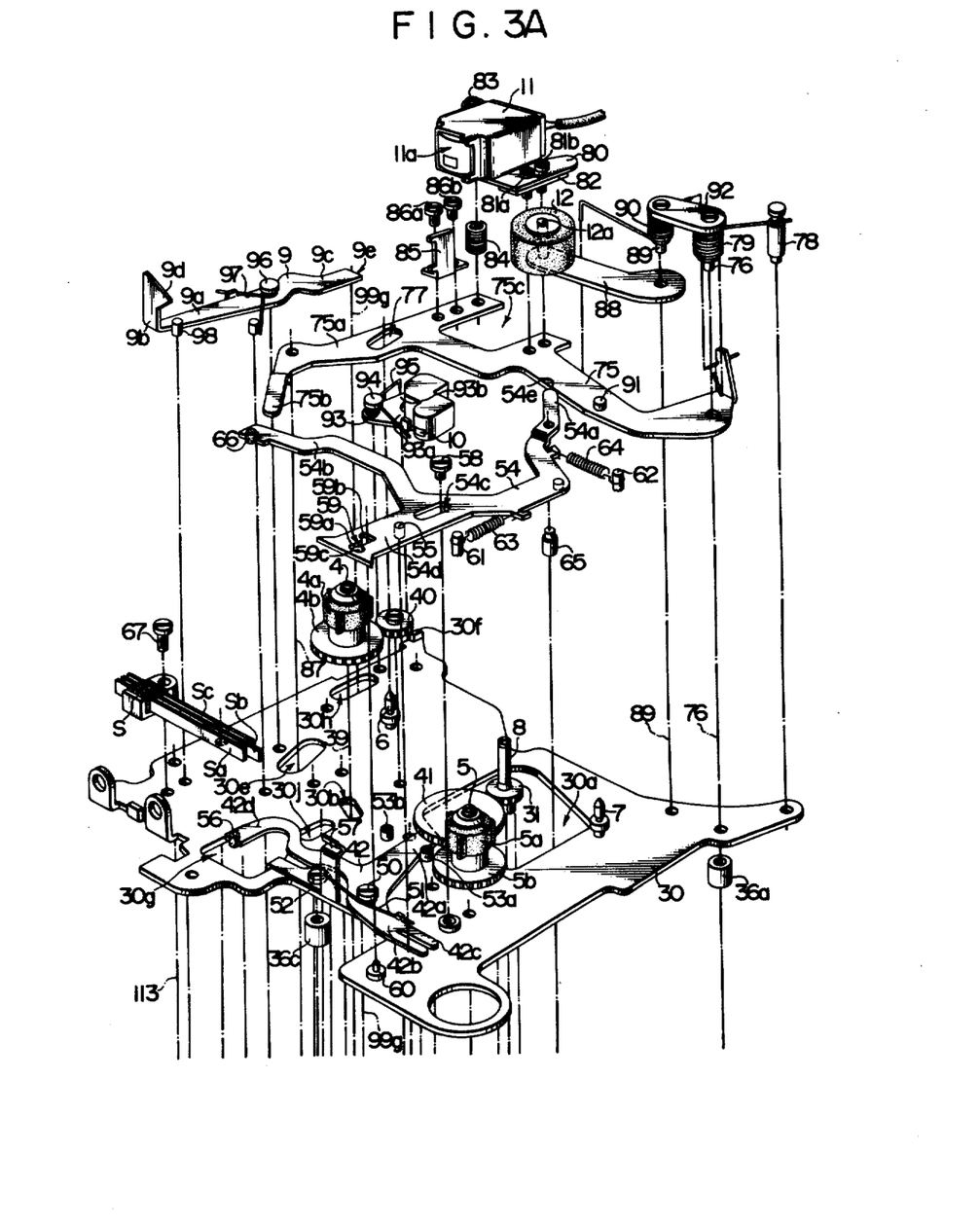
FIG. 3A is an exploded perspective view of various parts disposed on top of a stationary baseplate secured within the recorder.
Figure 3B:
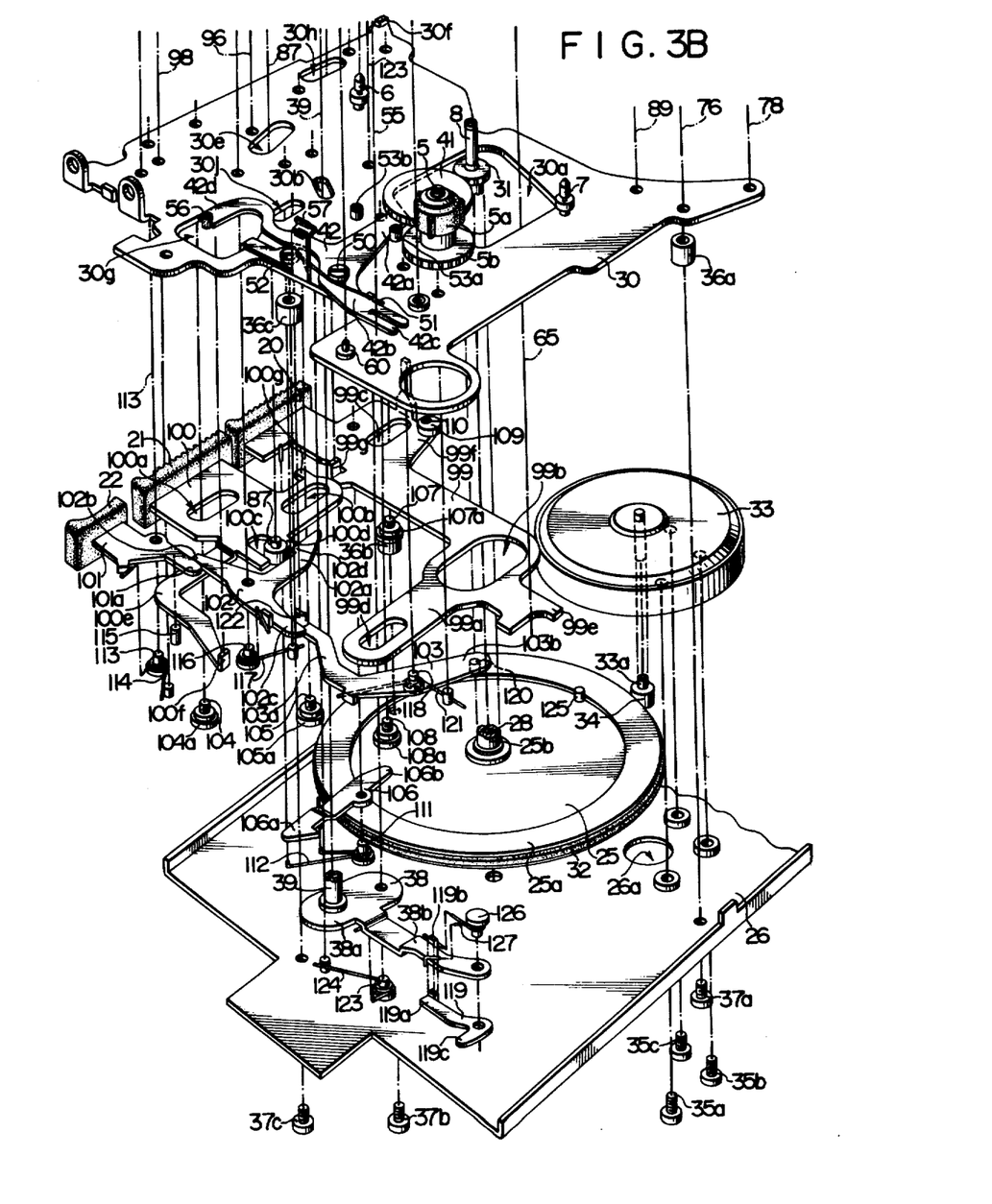
FIG. 3B is an exploded perspective view of various parts located on the underside or below the stationary baseplate.

Referring to FIG. 3B, the capstan 8 is integrally joined with a flywheel 25, and is rotatably mounted on a support plate 26 which is located below the panel 3 (see FIG. 1) and fixedly mounted within the recorder housing by suitable means. The periphery of flywheel 25 is formed with a portion 25a of an increased thickness, and its center formed with an upwardly extending stap shaft 25b, which is in turned formed with a step to provide a hollow shaft of a reduced diameter which serves as the capstan 8. The capstan 8 and its integral flywheel 25 are rotatably mounted on the support plate 26 by means of a support shaft 28, which is fixedly mounted on the support plate 26 through a suitable bearing and which tightly extends through the hollow shaft 8. A downward movement of the capstan 8 and flywheel 25 is prevented by the abutment of the inner surface of the step located between the stab shaft 25b and the capstan 8 against the upper end face of the bearing. An upward movement of the capstan 8 and flywheel 25 is prevented by a locking screw threadably engaging the upper end of the support shaft 28 and having a dished head which bears against the upper end face of the capstan 8. The capstan 8 extends through an opening 3a (see FIG. 1) formed in the panel 3 into the cassette receiving region 2a (FIG. 1).

Figure 4:
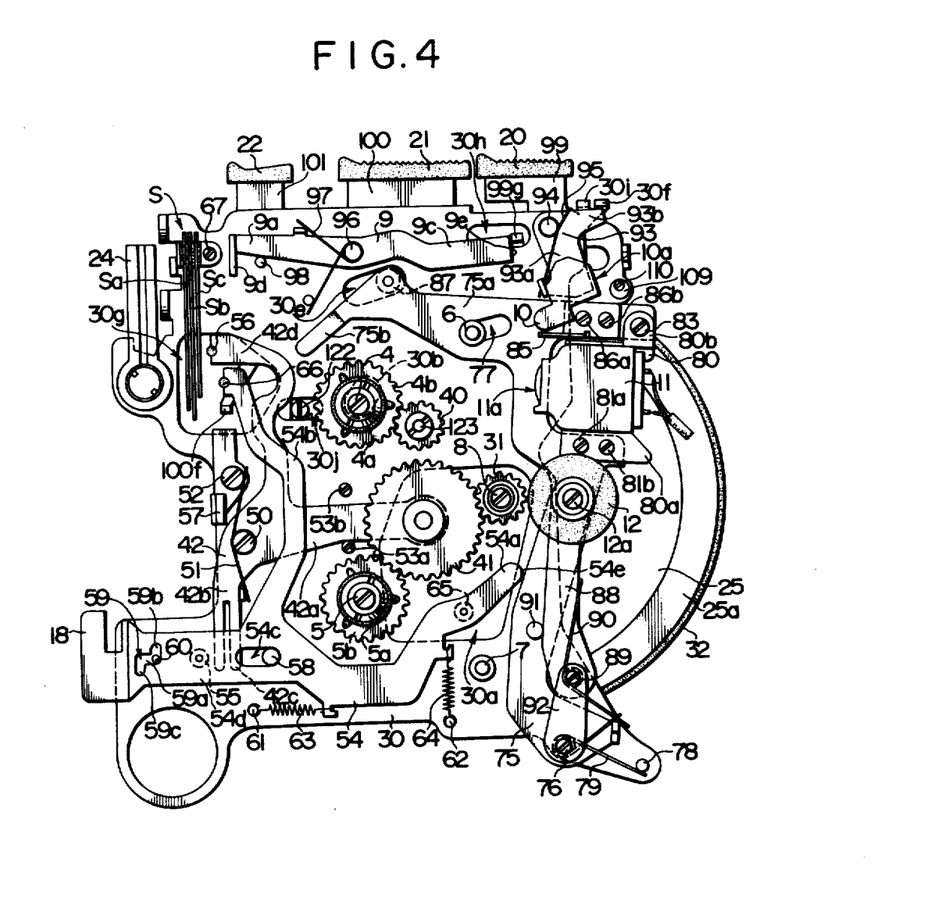
FIG. 4 is a plan view of various parts disposed on top of the baseplate, including a rotary drive mechanism of the invention.

A stationary baseplate 30 is located intermediate the panel 3 and the support plate 26 and is fixedly mounted on the latter. The baseplate 30 is formed with an opening 30a through which the stab shaft 25b of the flywheel 25 extends. Thus, the step formed at the upper end of the stab shaft 25b is located slightly above the upper surface of the baseplate 30. A drive gear 31 of a reduced diameter is tightly fitted on the step, and is made integral with the stap shaft 25b as by shrinkage fit. The drive gear 31 meshes with a drive switching gear 41 disposed on the baseplate 30 and which will be described later with reference to FIGS. 3A as well as 3B and 4.

The peripheral surface of the flywheel 25 is formed with a groove which is tightly engaged by a drive transmission member in the form of a drive belt 32 for rotatively driving the flywheel 25. The belt 32 comprises an endless belt of a rubber material having a high coefficient of friction, and naturally forms a loop of a diameter which is slightly less than the diameter of the flywheel 25. The belt 32 is fitted into the peripheral groove by slightly stretching the belt, so as to dispose it in bearing engagement with a wheel 34 fixedly mounted on an output shaft 33a of a miniature motor 33 (see FIG. 3B) for transmitting the rotating drive of the motor 33 to the flywheel 25. The motor 33 is mounted on the support plate 26 by means of set screws 35a, 35b, 35c, with its output shaft 33a extending in the downward direction. The output shaft 33a extends toward an opening 26a formed in the support plate 26. In this manner, the output wheel 34 of the motor is directly (frictionally) coupled with the flywheel 25 in the tape recorder of the invention. It will be understood that the rotating drive of the motor 33 is transmitted through the wheel 34, belt 32 and flywheel 25 to the capstan 8, which is therefore driven for rotation at a unform rate to feed the tape at a uniform rate by cooperation with the pinch roller 12 (FIG. 1).

(2) Drive mechanism for tape supply and tape takeup shafts

This mechanism is adapted to selectively drive one of the tape supply shaft 4 (which will be a tape rewind shaft during a tape rewind mode) and the tape takeup shaft 5 (which will be a tape supply shaft during a tape rewind mode) both rotatably mounted in the baseplate 30, thus rotating such shaft by the drive from the capstan 8.

As shown in FIG. 3B, the baseplate 30 is fixedly mounted on the support plage 26 by means of spacers 36a, 36b, 36c and set screws 37a, 37b, 37c. As shown in FIGS. 3A, 3B and 4, the shafts 4, 5 are located centrally toward the left of the baseplate 30 so as to assume symmetrical positions with respect to the capstan 8. Before describing various parts, it should be noted that the baseplate 30 is shown in FIGS. 3 and 4 in an orientation such that its left-hand side corresponds to the operation panel 2d shown in FIG. 1. Every part mounted on the baseplate 30 is shown in top view, and parts mounted on the underside of or located below the baseplate 30 are shown as viewed through the baseplate 30.

Referring to FIGS. 3A, 3B and 4, the tape supply shaft 4 is rotatably mounted on a support shaft 39 which is fixedly mounted on one arm 38a of a tape end detecting lever 38 which is in turn pivotally mounted on the underside of the baseplate 30. As will be described later, the detecting lever 38 is adapted to be driven for angular movement about its pivot by a rotating drive applied to the shaft 4, as a tape end is reached during the tape transport in the forward direction, thus automatically stopping the tape recorder 2. The support shaft 39 extends through an arcuate opening 30b formed in the baseplate 30 and having a sufficient clearance with respect to the shaft, and the tape supply shaft 4 is rotatably mounted on the top end of the support shaft 39. The tape supply shaft 4 comprises a fitting portion 4a which is adapted to fit in the tape hub 1b, a drive gear 4b, and a slip mechanism interposed between the fitting portion 4a and the drive gear 4b. During a tape rewind mode and a review mode, the rotating drive transmitted to the drive gear 4b is transmitted through the slip mechanism to cause the fitting portion 4a to rotate in the counterclockwise direction, thus rotating the tape hub 1b to take up the tape thereon. The drive gear 4b meshes with an idle gear 40 which is rotatably mounted adjacent thereto and through which the rotating drive is transmitted to the gear 4b. The gear 40 has a support shaft 123 which pivotally carries the detecting lever 38 on the underside of the baseplate 30.

On the other hand, the tape take-up shaft 5 is disposed toward the left and the downward side of the baseplate 30, as viewed in FIG. 4, and fits into the other tape hub 1c of the cassette. The shaft 5 is symmetrically located relative to the shaft 4 with respect to the capstan 8, and is rotatably mounted on a stationary shaft, not shown, which is secured to the baseplate 30. The shaft 5 also comprises a fitting portion 5a which mates with the hub 1c, a drive gear 5b, and a slip mechanism interposed between the gear 5b and the fitting portion 5a. A rotating drive is transmitted to the drive gear 5b during a record, playback, rapid tape advance and cue mode of the recorder, thereby rotating the portion 5a and hence the hub 1c clockwise through the slip mechanism to take up the tape thereon. The rotating drive to the gear 5b is transmitted from the drive gear 31 through a drive switching gear 41 which meshes with the gear 5b. The drive switching gear 41 is rotatably mounted on a drive switching lever 42 to be described later, and normally meshes with the drive gear 31 on the capstan 8 and the drive gear 5b, thus transmitting the rotation of the capstan to the drive gear 5b for rotation of the tape take-up shaft 5. The rotating drive to the drive gear 4b of the tape supply shaft 4 is transmitted through the meshing engagement between the switching gear 41 on one hand and the drive gear 31 and the idle gear 40 on the other hand, which is achieved by rocking the drive switching lever 42 counterclockwise about its pivot to angularly move the gear 41 clockwise about the drive gear 31 on the capstan 8.

In this manner, the rotary drive mechanism of the invention which drives the tape shafts is adapted to drive either tape shaft selectively by the switching action of the drive switching gear 41 as is described in the parent application.

Referring to FIGS. 3A and 4, the drive switching lever 42 is pivotally mounted at 50 on the baseplate 30 toward the left-hand edge thereof. The lever 42 includes three arms, including a first arm 42a extending toward the capstan 8 and rotatably carrying the drive switching ear 41 on the distal end thereof. The lever 42 is urged to rotate clockwise about the pivot 50 by a torsion spring 51 having its one end anchored to a second arm 42b of the lever 42 and its other end engaged with a screw 52 which is threadably engaged with the baseplate 30. However, the resulting rotation of the lever 42 is normally prevented by the abutment of the first arm 42a against a stop pin 53a fixedly mounted on the stationary baseplate 30. In this position, the drive switching gear 41 is maintained in meshing engagement with the drive gear 31 and the drive gear 5b. As will be mentioned below, the drive switching lever 42 is adapted to rotate counterclockwise about the pivot 50 as a tape rewind member 54 is depressed. The resulting rotation is limited by the abutment of the first arm 42a of the lever 42 against a stop pin 53b fixedly mounted on the baseplate 30. When the lever assumes such position, the drive switching gear 41 is maintained in meshing engagement with the idle gear 40. The second arm 42b extends in a direction perpendicular to the first arm 42a or downward as viewed in FIG. 4, over the baseplate 30, and its distal end 42c is forked. The purpose of providing the forked distal end 42c of the second arm 42b is to provide an optimum degree of meshing engagement between the drive switching gear 41 and the idle gear 40 as a tape rewind member 54 is depressed to cause a depending pin 55 therefrom to drive the forked end 42c to move the lever 42 counterclockwise. Specifically, by adjusting the gap width of the forked end and the distance between the forked end 42c and the depending pin 55, the degree of meshing engagement between the drive switching gear 41 and the idle gear 40 can be adjusted as the lever 42 rotates counterclockwise.

The lever 42 includes a third arm 42d which extends in the opposite direction from the second arm 42b and which is formed with a U-shaped distal end, which is open toward the left-hand edge of the baseplate 30 as viewed in FIG. 4. The distal end has an electrically insulating member 56 secured to the extremity thereof. The third arm 42d forms a switch actuating member, and the insulating member 56 is located opposite to a main switch S which is mounted on the baseplate 30 by means of a set screw 67. The main switch S comprises three conductive movable blade contacts Sa, Sb, Sc. When the movable contacts Sa and Sb engage with each other, the motor 33 (shown in FIG. 3B) is driven for rotation at a uniform rate, and when the three contacts Sa, Sb, Sc all engage with each other, the motor 33 is driven for rotation at a higher rate. The insulating member 56 operates to bring all of the three movable contacts Sa, Sb, Sc into engagement with each other to cause a rotation of the motor 33 at the higher rate, by pushing against the contact Sc when the lever 42 is rotated counterclockwise about the pivot 50.

The torsion spring retaining screw 52 also functions to secure a cassette retaining spring 57 to the baseplate 30. The retaining spring 57 comprises a thin, resilient blade having a riser portion which extends along the lefthand edge of the cassette receiving region 2a (see FIG. 1) to bear against one end face of a loaded cassette, to urge the positioning openings 1e, 1d (FIG. 1) against the positioning pins 6, 7.

The tape rewind member 54 is disposed in a floating manner over the baseplate 30 at a position below the drive switching lever 42, as viewed in FIG. 4. Referring to FIG. 4, the tape rewind member 54 includes a first arm 54a extending to the right, a second arm 54b extending upward and a third arm 54d extending to the left, generally forming an inverted T-shaped configuration. The member 54 is centrally formed with an elongated guide slot 54c, which is engaged by a stud 58 fixedly mounted on the baseplate 30, thus making member 54 displaceable. The slot 54c extends in the direction of the first and third arms, and the rewind member 54 is capable of a sliding movement over the length of the slot 54c and an angular movement about the stud 58. These movements are triggered by the depression of the operating button 18 which is secured to the outer end of the third arm 54d.

The third arm 54d of the tape rewind member 54 is formed with a slot 59 for controlling the direction of the movement of the member and for locking the member in its tape rewind position. Specifically, the slot 59 is formed adjacent to the outer end of the third arm 54d, and includes a long slot portion 59a extending lengthwise of the third arm 54d, a short slot portion 59b extending upward from the inner end of the slot portion 59a, and a short slot portion 59c extending downward from the outer end of the slot portion 59a, thus resulting in a key-hole configuration. The slot 59 is engaged by a pin fixedly mounted on the baseplate 30.

The forked distal end 42c of the lever 42 extends below a region of the third arm 54d located between the slots 59 and 54c. The pin 55 depends downwardly from the third arm 54d at a position between the distal end 42c and the slot 59 for operating the distal end 42c. The first arm 54a has a slant formed in it intermediate its length, extending obliquely upward, and its distal end extends toward the capstan 8. A pair of pins 61, 62 are fixedly mounted on the baseplate 30, and a pair of coiled tension springs 63, 64, acting as return springs, respectively, have one end anchored to these pins and the other end engaged with hook-like projections provided along the first arm 54a. As a consequence, the tape rewind member 54 is biased by the springs 64 for clockwise rotation about the stud 58, and is also biased by the spring 63 for sliding movement to the left with respect to the baseplate 30. However, the tendency of the member 54 to slide to the left is normally blocked by the abutment of the right-hand edge of the guide slot 54c against the stud 58, and the tendency of the member 54 to rotate clockwise is blocked by the abutment of the right-hand edge of the long slot portion 59a against the pin 60.

A downwardly depending pin 65 is fixedly mounted on the first arm 54a adjacent to the distal end thereof, and extends through the opening 30a formed in the baseplate 30. The purpose of the pin 65 is to disable the depression of the tape rewind member 54 when the tape recorder 2 is in its record mode, as is described in detail in the aforementioned parent application.

The distal end 54e of the first arm 54a is located opposite to the inner edge of a pinch roller support arm 88 to be described later. In the playback mode of the tape recorder, when the tape is rewound to permit a review operation, the distal end 54e moves the pinch roller support arm 88 as the tape rewind member 54 moves, thus moving the pinch roller 12 away from the capstan 8.

The second arm 54b extends above the drive switching lever 42 and extends in the same direction as the third arm 42d thereof to form a switch actuating arm. Specifically, the distal end of the second arm 54b is located adjacent to the distal end of the third arm 42d so as to be located opposite to the main switch S. An electrically insulating member 66 for operating the main switch S is secured to the extremity thereof. The insulating member 66 functions in a manner similar to the insulating member 56 and is located opposite the movable contact Sc of the main switch S so that it brings all of the movable contacts Sa to Sc of the main switch S into engagement with each other to cause rotation of the motor 33 at the higher rate for a rapid tape advance in response to movement of the operating button 18 to rotate the tape rewind member 54 counterclockwise about the stud 58.

It will be understood that the tape rewind member 54 enables a rapid tape advance in addition to a tape rewind operation, and when a rapid tape advance is activated during the playback mode of the tape recorder, a cue operation is enabled. Similarly, a tape rewind operation during the playback mode enables a review operation. In this manner, the rotating drive from the capstan 8 is transmitted to either tape take-up shaft 5 or tape supply shaft 4 through the drive switching gear 41, thus properly driving one of these shafts. However, the rotating drive from the capstan 8 is normally transmitted to drive the tape take-up shaft 5 as shown in FIG. 4 since the drive switching lever 42 which supports the drive switching gear 41 is rotated clockwise about the pivot 50 under the resilience of the spring 51.

(3) Mechanism for enabling record, playback, stop, rapid tape advance, rewind and auto shut-off operations This mechanism is adapted to make the erase head 10, record/playback 11 and pinch roller 12, which are movably disposed on the stationary baseplate 30, either operative or inoperative in response to an operation of the record, playback and stop members which are disposed below the baseplate 30. Referring to FIGS. 3A and 4, a head support plate 75 carrying the head 11 is rockably mounted on a pivot 76 fixedly mounted on the baseplate 30 at a position over the baseplate 30 toward the lower right-hand end thereof, as viewed in FIG. 4. The support plate 75 extends generally along the right-hand edge, as viewed in FIG. 4, of the baseplate 30 and then extends to the left, forming a guide arm 75a, the distal end of which extends to the proximity of the tape supply shaft 4. The guide arm 75a is formed with an elongated guide slot 77 which is in the form of an arc centered about the pivot 76. The slot 77 is engaged by the cassette positioning pin 6 which is fixedly mounted on the baseplate 30, thus making the head support plate 75 rockable counterclockwise about the pivot 76. However, the support plate 75 is normally biased to rotate clockwise about the pivot 76 by a torsion spring 79 having its one end anchored thereto and its other end engaged with a pin 78 fixedly mounted on the baseplate 30. The resulting rotation of the support plate is limited by the pin 6, and the support plate 75 remains at rest in this position.

The record/playback head 11 is disposed on the middle portion of the head support plate 75. The head 11 is located so that its head surface 11a faces the tape supply shaft 4, and is mounted on the support plate 75 by means of a single thin, resilient head mounting plate 80. One end of the head mounting plate 80 which is located nearer the pivot 76 is secured to the support plate 75 by means of a pair of set screws 81a, 81b, with a spacer 82 interposed therebetween. The other end of the plate 80 is bent at right angles to extend upwardly, and this vertically extending portion is partly folded outwardly to extend in a horizontal plane, thus forming an adjusting piece 80b. A relatively long adjusting screw 83 extends through the adjusting piece 80b from above, and is threadably engaged with the head support plate 75 by passing through a coiled compression spring 84 which is interposed between the piece 80b and the support plate 75. In this manner, the head 11 is supported by the support plate 75 in a cantilever fashion, and the elevation and horizontal position thereof can be adjusted by turning the adjusting screw 83.

In accordance with the invention, the head mounting structure is sophisticated in a manner to be described below. A portion of the support plate 75 is notched in the region of the head mounting plate 80, which therefore can be moved into the notch 75C (see FIG. 3A). With this arrangement, when the screw 83 is turned to adjust the elevation and the azimuth of the head 11 relative to the tape, the head 11 and the mounting plage 80 can be brought into the notch 75c, enabling the thickness of the tape recorder to be reduced. It will be noted in FIGS. 3A and 4 that a tape guide member 85 is located adjacent to the adjusting screw 83 and is secured to the support plate 75 by means of set screws 86a, 86b.

A downwardly depending actuator pin 87 is fixedly mounted on the support plate 75 between the guide arm 75a and the distal end 75b thereof, and extends through an elongated guide slot 30e formed in the baseplate 30 and which moves along an arcuate bath whose center is the pivot 76, for fitting engagement with a forked portion 100c of a playback member 100 (see FIG. 5) to be described later. When the playback member 100 is operated, the actuator pin 87 moves within the slot 30e to cause an angular movement of the support plate 75 about the pivot 76, thus moving the head 11 to its operative position.

A pinch roller support arm 88 is rockably disposed on the support plate 75. Specifically, one end of the support arm 88 is rockably mounted on a pivot 89 which is fixedly mounted on the baseplate 30 adjacent to the pivot 76 of the support plate 75. The other end of the support arm 88 extends to the proximity of the head 11 and has a shaft 12a fixedly mounted thereon for rotatably carrying the pinch roller 12 at a position opposite the capstan 8. The support arm 88 is biased for counterclockwise rotation about the pivot 89 by a torsion spring 90 having its one end anchored to the support arm and its other end engaged with the head support plate 75. However, the resulting rotation of the support arm 88 is normally blocked by a stop pin 91 fixedly mounted on the support plate 75. When the support plate 75 rotates counterclockwise about the pivot 76, the support arm 88 for the pinch roller is able to follow the movement of the support plate 75 by turning counterclockwise about the pivot 89, thus bringing the pinch roller 12 into abutment against the capstan 8. A retaining plate 92 is secured to the upper end faces of the pivots 89, 76 for preventing the withdrawal of the torsion springs 90, 79 from these pivots.

A support member 93 for the erase head 10 is located to the substrate 30 adjacent to the head 11 and comprises an L-shaped rockable lever having its central portion mounted on a pivot 94 which is in turn fixedly mounted on the baseplate 30. The member 93 has one arm 93a which extends toward the head 11, and has the erase head 10 fixedly mounted on the distal end. The erase head 10 comprises a permanent magnet which is molded in a synthetic resin material. The support member 93 is biased for counterclockwise rotation about pivot 94 by torsion spring 95 having its ends engaging the baseplate 30 and a tab provided along the arm 93a. Rotation is blocked by the abutment of another arm 93b against a vertical piece 30f bent upwardly from the right-hand end of the upper edge of the baseplate 30. The arm 93b extends rearwardly along the upper edge of the baseplate 30 or to the right as viewed in FIG. 4. During a record mode, the erase head 10 can be moved into a position in which its head surface bears against the magnetic tape, by a pusher 109 attached to the record member 99 to be described later.

The lug detecting member 9 which detects the presence or absence of lugs 1g, 1h provided along the side-walls of the cassette loaded into the recorder, comprises a lever extending along the upper edge of the baseplate 30, and has its central portion mounted on a pivot 96 fixedly mounted on the baseplate 30. The member 9 has one arm 9a whose free end is bent upwardly as shown at 9b to provide the lug detecting piece 9d (shown in FIG. 1) which extends into the cassette receiving region 2a of the tape recorder along one side thereof. The detecting piece 9d operates to detect the presence or absence of one of the lugs, for example, lug 1g, of the cassette loaded into the recorder.

The lug detecting member 9 has another arm 9c which extends in the opposite direction from the arm 9a and which is provided at its free end with a blocking piece 9e which blocks movement of the record member to its operative position when the lug is absent. The lug detecting member 9 is biased for counterclockwise rotation about the pivot 96 by a torsion spring 97 disposed thereon, but the resulting rotation is normally prevented by the abutment of its arm 9a against a stop pin 98 fixedly mounted on the baseplate 30. Under this condition, the blocking piece 9e bears against a riser piece 99g of the record member 99 to constrain its movement.

The individual operations of the mechanism will be described below.

(A) Playback

Figure 6:
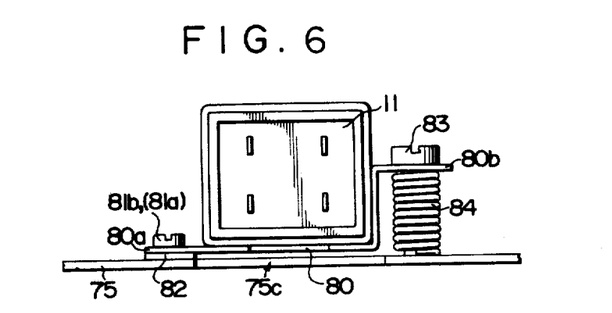
FIG. 6 is a rear view of the device.

A playback operation is enabled by sliding the playback button 21 (see FIGS. 2 and 3B) toward the stop button 22 after a micro-cassette 1 has been loaded in the cassette receiving region 2a (see FIG. 1) of the tape recorder 2. In response to a sliding movement of the playback button 21, the playback member 100 moves toward the stop member 101 under the guiding action of the support shafts 104, 105. As the member 100 slides, the actuator pin 87 which engages the fork 100c thereof moves diagonally from right to left within the slot 30e, whereby the head support plate 75 on which the pin 87 is fixed rotates counterclockwise about the pivot 76 against the resilience of the spring 79 while being guided by the positioning pin 6, as shown in FIG. 6. The rocking motion of the support plate brings the head 11 to a playback position in which the head surface 11a bears against the magnetic surface of the tape T. As the support plate 75 moves to its operative position, the pinch roller support arm 88 which is connected therewith by the spring 90 rotates counterclockwise about the pin 89, thus bringing the pinch roller 12 to its operative position in which it bears against the capstan 8 through the tape T interposed therebetween.

The movement of the playback member 100 to its operative position causes the switch actuator arm 100e to move to the left, whereby the switch actuator 100f closes the main switch S by bringing its movable contacts Sa and Sb into engagement with each other. Thus, the motor 33 is energized to set the tape drive system into motion, and capstan 8 and pinch roller 12 cooperate to feed tape T from tape supply shaft 4 to take-up shaft 5. A playback operation is performed by the tape T running past the head surface 11a.

In this manner, when the button 21 is depressed to a given position, the playback member 100 moves through a given stroke to establish a playback mode of the tape recorder. When the playback member 100 reaches a given position, the abutment between the hook-shaped end 102d of the locking member 102 and the projection 100d of the member 100 is released, whereupon the locking member 102 becomes free to rotate counterclockwise about the pin 116 under the resilience of the spring 117. Thereupon, the hook-shaped end 102d engages the projection 100d to lock the playback member 100 in position. Hence, a returning movement of the playback member 100 is prevented by the locking member 102.

(B) Record

A record operation is enabled by simultaneously sliding the record and playback buttons 20, 21 (see FIGS. 2 and 3B) toward the stop button 22 after a micro-cassette 1 has been loaded in the cassette receiving region 2a of the tape recorder.

Before sliding the buttons 20, 21, the presence or absence of lug 1g (or 1h) is detected when the micro-cassette 1 is loaded. If the lug which is provided on the part of the cassette for preventing an inadvertent erasure is removed, no further recording is possible on the tape contained in the cassette. Thus, the presence of the lug is a prerequisite to performing a record operation. The lug detector 9d of the detecting member 9 operates to detect the presence or absence of the lug 1g in the cassette when it is loaded on the cassette receiving region 2a. If the lug 1g (or 1h) is removed from the cassette, the lug detector 9d moves into the space created by the removal of the lug, whereby the lug detecting member 9 rotates to a position in which it stays under the bias applied thereto. As a consequence, the blocking piece 9e of the lug detecting member 9 abuts against the riser piece 99g of the record member 99, preventing its movement to its operative position. However, when the cassette 1 is provided with the lug 1g, the lug detector 9d is driven by the lug 1g, whereby the lug detecting member 9 rotates clockwise about the pivot 96 against the bias, moving the blocking piece 9e away from the path of movement of the riser piece 99g, enabling movement of the record member 99 to its operative position.

When movement of the record member 99 is allowed, both members 99, 100 slide in an integral manner as a result of the hook 100g of the playback member 100 being engaged by the hook-shaped end 106a of the connecting member 106 mounted on the record member 99. Specifically, when the record member 99 moves to the left, the connecting member 106 rockably mounted thereon moves together therewith, moving the arm 106b away from the depending piece 30i which has been constraining a rocking movement thereof. Thus, the member 106 rocks counterclockwise about the pivot 111 under its own bias, bringing its hook-shaped end 106a into engagement with the hook 100g of the playback member 100, thus allowing an integral movement of both members 99, 100 to their operative position. The resulting operation which occurs as a result of a movement of the playback member 100 to its operative position is exactly the same as mentioned above under the description dealing with playback operation, and therefore will not be repeated.

When the record member 99 slides under the guiding action of the support shafts 107, 108 as the playback member 100 moves, the pusher member 109 mounted on the upper portion thereof drives the side 10a of the erase head 10, thereby rotating the erase head support member 93 clockwise about the pivot 94 against its own bias to locate the erase head 10 in its operative position in which it bears against the tape T, thus allowing unnecessary signals on the tape to be erased.

When both members 99, 100 have moved to their operative position, the playback member 100 is locked in its operative position by the locking member 102 as is the record member 99 which is operatively connected therewith through the connecting member 106. Thus, the erase head 10 becomes operative in response to a movement of the record member 99 to its operative position while the record/playback head 11 becomes operative in response to a movement of the playback member 100 to its operative position. In the operative position of the record member 99, the depending pin 65 from the tape rewind member 54 abuts against the projection 99e on the record member 99, thus disabling an operation of the tape rewind member. The purpose of disabling the tape rewind member 54 during a record mode is to prevent a rapid tape advance, rewind, cue and review operation from being inadvertently performed during such mode.

The other operating features such as stop, tape rewind, rapid tape advance and automatic tape shut off are described in detail in the aforementioned parent application.

Returning to the head assembly, FIG. 4 shows, in top view, a record/playback head 11 which is movably disposed above the upper surface of a stationary baseplate 30 secured within a small size tape recorder. Toward the rear end (right-hand side as viewed in FIG. 4) of the stationary baseplate 30, a head support plate 75 is pivotally mounted on a pin 76 which is fixedly mounted on the baseplate 30. A record/playback head 11 is placed on the support plate 75 in the middle region thereof. The head 11 is mounted on the support plate 75 by means of a single, thin, head mounting plate 80 so that its head surface 11a is directed toward a tape supply shaft 4.

Figure 5:
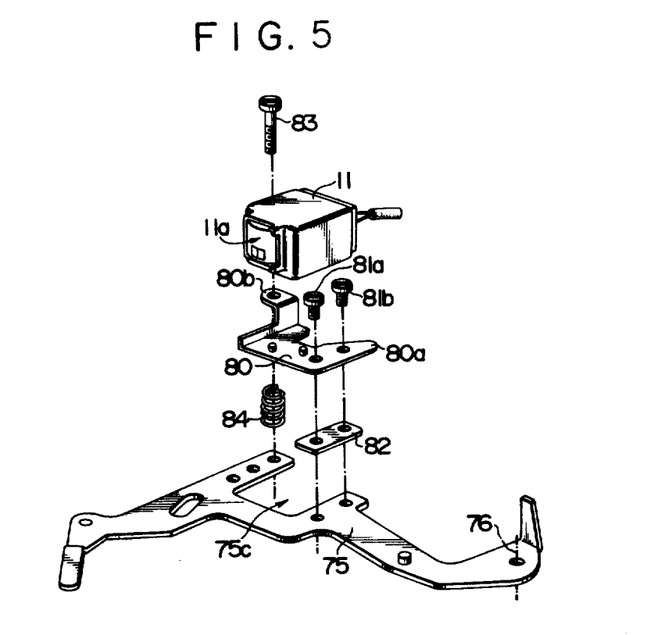
FIG. 5 is a further exploded perspective view of the device shown in FIG. 3A.

As shown in FIGS. 3A, 5 and 6, the mounting plate 80 comprises a resilient sheet, and the head 11 rests centrally thereon and is secured thereto. On the side nearer the pin 76, the plate 80 has an extension 80a, which is secured to the support plate 75 by a pair of set screws 81a, 81b with a spacer piece 82 interposed therebetween. The opposite side of the mounting plate is bent at right angles to extend upwardly and has an outwardly extending horizontal projection 80b which receives an adjusting screw 83 of substantial length. The screw 83 is passed through an opening in the extension 80b from above and threadedly engages the support plate 75, with a coiled compression spring 84 disposed around the screw between the extension 80b and the support plate 75. In this manner, the head is supported by the support plate 75 in a cantilever fashion, and the elevation and the levelling of the head is adjusted by turning the screw 83.

In the region of the mounting plate 80 to which the head is secured, the support plate 75 is formed with a notch 75c, which is large enough to receive the mounting plate 80 as it is inserted from above.

The described arrangement permits the head 11 and the mounting plate 80 to assume their position within the notch when adjusting the elevation and azimuth of the head 11 relative to the tape by turning the screw 83. Thus the free space required for the vertical adjustment of the head is reduced, contributing to a reduction in the thickness of the tape recorder.

In FIG. 4, numeral 5 represents a tape take-up shaft and 12 a pinch roller. While the above description deals with a record/playback head, it should be understood that the invention is equally applicable to an erase head, including the erase head 10 shown in FIGS. 1 and 3a.

What is claimed is:

1. A magnetic head mounting device for adjusting the position of a magnetic head of a small size tape recorder wherein record and playback are performed by moving a surface of the magnetic head into a tape cassette disposed in a cassette receiving region of the tape recorder, said tape recorder including operating buttons, a head support plate having a planar portion within a segment thereof cut away to form a notch, means for pivotally mounting said head support plate for rotation by actuating said operating buttons, a head mounting plate having a planar portion in which one end is fixedly mounted on said head support plate and the opposite end formed to define an outwardly extending portion parallel to said last-mentioned planar portion, said magnetic head fixedly mounted on said planar portion of said head mounting plate for adjustment therewith, and means cooperating with said head support plate and said extending portion for adjusting the position of said head mounting plate with said magnetic head relative to and into said notch to adjust the azimuth of the magnetic head relative to a magnetic tape of said tape cassette whereby the range of adjustment of said magnetic head is increased by at least the thickness of said notch.

2. The apparatus of claim 1 wherein a spacer element is positioned between said support plate and said mounting plate for cooperating with said adjusting means to further increase said range of adjustment by the thickness of said spacer element.

3. The apparatus of claim 1 wherein said adjusting means includes a coiled compression spring disposed between said mounting plate and said support plate, and said adjusting means including an adjusting device for adjusting the compression of said spring to vary the position of said mounting plate relative to said support plate.

* * * * *